United States Patent
Barzik et al.

(10) Patent No.: US 10,353,732 B2
(45) Date of Patent: *Jul. 16, 2019

(54) SOFTWARE-DEFINED COMPUTING SYSTEM REMOTE SUPPORT

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Michael Green, Westborough, MA (US); Rivka M. Matosevich, Zichron-Ya'acov (IL); Vladimir Zaslavski, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,523

(22) Filed: Nov. 2, 2017

(65) Prior Publication Data

US 2018/0060109 A1 Mar. 1, 2018

Related U.S. Application Data

(63) Continuation of application No. 14/976,020, filed on Dec. 21, 2015, now Pat. No. 9,864,624.

(51) Int. Cl.
*G06F 9/455* (2018.01)
*G06F 9/54* (2006.01)

(52) U.S. Cl.
CPC ............ *G06F 9/45558* (2013.01); *G06F 9/54* (2013.01); *G06F 2009/45575* (2013.01);
(Continued)

(58) Field of Classification Search
CPC ............ G06F 9/45533; G06F 9/45558; G06F 2009/45591; G06F 11/3055;
(Continued)

(56) References Cited

U.S. PATENT DOCUMENTS 9,497,136 B1 * 11/2016 Ramarao ............. G06F 9/45558
2004/0128585 A1 * 7/2004 Hind ..................... G06F 11/366
714/38.14

(Continued)

FOREIGN PATENT DOCUMENTS

| EP | 2369479 A2 | 9/2011 |
| WO | 2011119298 A1 | 9/2011 |
| WO | 2014198567 A1 | 12/2014 |

OTHER PUBLICATIONS

Cossu et al., "D5. 2: XIFI Core Backbone," Revision: v.1.0, Apr. 29, 2014 (104 pages).

(Continued)

*Primary Examiner* — Dong U Kim
(74) *Attorney, Agent, or Firm* — Griffiths & Seaton PLLC

(57) ABSTRACT

Methods, computing systems and computer program products implement embodiments of the present invention that include initializing, by a hypervisor executing on a processor, first and second virtual machines. A first software application configured to provide a service is executed on the first virtual machine, and a logical data connection is established between the first and the second virtual machines. Examples of the logical connection include physical and virtual serial connections, and physical and virtual data networking connections. A second software application configured to enable remote monitoring of the first software application via the logical data connection is executed on the second virtual machine. In some embodiments, the second software application can remotely monitor the first software application via an interface such as a command line interface, a graphical user interface and an application programming interface.

20 Claims, 4 Drawing Sheets

(52) U.S. Cl.
CPC .............. *G06F 2009/45579* (2013.01); *G06F 2009/45591* (2013.01); *G06F 2009/45595* (2013.01)

(58) Field of Classification Search
CPC ............ G06F 11/3089; G06F 11/3409; G06F 2009/45595; G06F 9/5077
See application file for complete search history.

(56) References Cited

U.S. PATENT DOCUMENTS

| | | | |
|---|---|---|---|
| 2006/0230407 A1* | 10/2006 | Rosu | G06F 9/5088 718/105 |
| 2007/0073858 A1* | 3/2007 | Lakshmi Narayanan | H04L 63/1408 709/223 |
| 2007/0130566 A1* | 6/2007 | van Rietschote | G06F 9/45533 718/1 |
| 2007/0174915 A1* | 7/2007 | Gribble | G06F 21/53 726/24 |
| 2007/0198656 A1 | 8/2007 | Mazzaferri et al. | |
| 2007/0234302 A1* | 10/2007 | Suzuki | G06F 8/61 717/126 |
| 2009/0089300 A1* | 4/2009 | Vicente | H04L 41/0893 |
| 2009/0198766 A1* | 8/2009 | Chen | G06F 9/45558 709/202 |
| 2009/0276771 A1* | 11/2009 | Nickolov | G06F 9/4856 717/177 |
| 2010/0268764 A1* | 10/2010 | Wee | G06F 9/505 709/203 |
| 2010/0306763 A1 | 12/2010 | Lambert et al. | |
| 2011/0154333 A1* | 6/2011 | Miyamoto | G06F 9/45533 718/1 |
| 2011/0276951 A1* | 11/2011 | Jain | G06F 11/3006 717/140 |
| 2011/0283278 A1* | 11/2011 | Murrell | G06F 9/5077 718/1 |
| 2011/0302569 A1* | 12/2011 | Kunze | G06F 8/62 717/169 |
| 2011/0321044 A1* | 12/2011 | Huh | G06F 9/4443 718/1 |
| 2012/0066681 A1* | 3/2012 | Levy | G06F 9/5027 718/1 |
| 2013/0007729 A1 | 1/2013 | Sirotkin | |
| 2013/0346619 A1* | 12/2013 | Panuganty | H04L 41/12 709/226 |
| 2014/0052877 A1* | 2/2014 | Mao | H04L 61/103 709/245 |
| 2014/0237464 A1 | 8/2014 | Waterman et al. | |
| 2016/0314010 A1* | 10/2016 | Haque | G06F 9/45558 |

OTHER PUBLICATIONS

Shad, "Implementing a Virtual Desktop Infrastructure at the District of North Vancouver," Simon Fraser University, Summer 2011 (96 pages).
Barnier et al., "Virtualization and Its Benefits," AITP—Research and Strategy Advisory Group, Oct. 14, 2008 (40 pages).

* cited by examiner

US 10,353,732 B2

SOFTWARE-DEFINED COMPUTING SYSTEM REMOTE SUPPORT

CROSS-REFERENCE TO RELATED APPLICATIONS

This Application is a Continuation of U.S. patent application Ser. No. 14/976,020, filed on Dec. 21, 2015, the contents of which incorporated herein by reference.

FIELD OF THE INVENTION

The present invention relates generally to software-defined computing, and specifically to a method for remote identifying and correcting performance bottlenecks in a software-defined computing system.

BACKGROUND

In software-defined computing (SDC), a computing infrastructure is virtualized and delivered as a service. For example, in a software-defined storage (SDS) system storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scale-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with one embodiment of the present invention a method, including initializing in a software-defined computing system, by a hypervisor executing on a processor, first and second virtual machines; executing, on the first virtual machine, a first software application configured to provide a service; and executing, on the second virtual machine, a second software application configured to enable remote monitoring of the first software application via a data connection by deploying a virtual remote support connectivity client in the second virtual machine executing on the hypervisor using the first virtual machine as a proxy to enable the remote monitoring of the first software application. Additional apparatus and computer program product embodiments are also provided and supply related advantages.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide systems and methods for providing a virtual remote client for software defined computing systems (SDCs) to provide remote services for support and field-debugging. As explained hereinbelow, a hypervisor initializes first and second virtual machines, and a first software application is executed on the first virtual machine, the first software application configured to provide a service. Upon establishing a logical data connection between the first and the second virtual machine, the second virtual machine can execute a second software application that is configured to enable remote monitoring of the first software application via the logical data connection.

Systems implementing embodiments of the present invention can deploy a light-weight virtual remote support connectivity client in the second virtual machine that executes on the same hypervisor as the second virtual machine that manages the software defined computing system in the first virtual machine, thereby enabling the support client to communicate with the software defined computing system via channels (e.g., networking emulation within the hypervisor and serial port emulation) provided by the hypervisor. By using the first virtual machine as a proxy, the support client can access the software defined computing system even if the software defined computing system experiences serious errors which hamper network communications.

In some embodiments, a "tunnel" can be created on a data network coupling the virtual remote support connectivity client with the software defined computing system, in order to enable the remote support client to access the software defined computing system's virtual machine console output, physical and virtual serial channels (i.e., connections), and physical and virtual data networking connections (e.g., an IP connection within the hypervisor). By implementing the remote support connectivity client in a virtual machine, debugging and maintenance operations can be performed on the second virtual machine instead of using a screen-sharing solution such as remote desktop, which may be complicated (and not always possible) in terms of security policies and is typically extremely cumbersome to implement and use.

Figure 1:
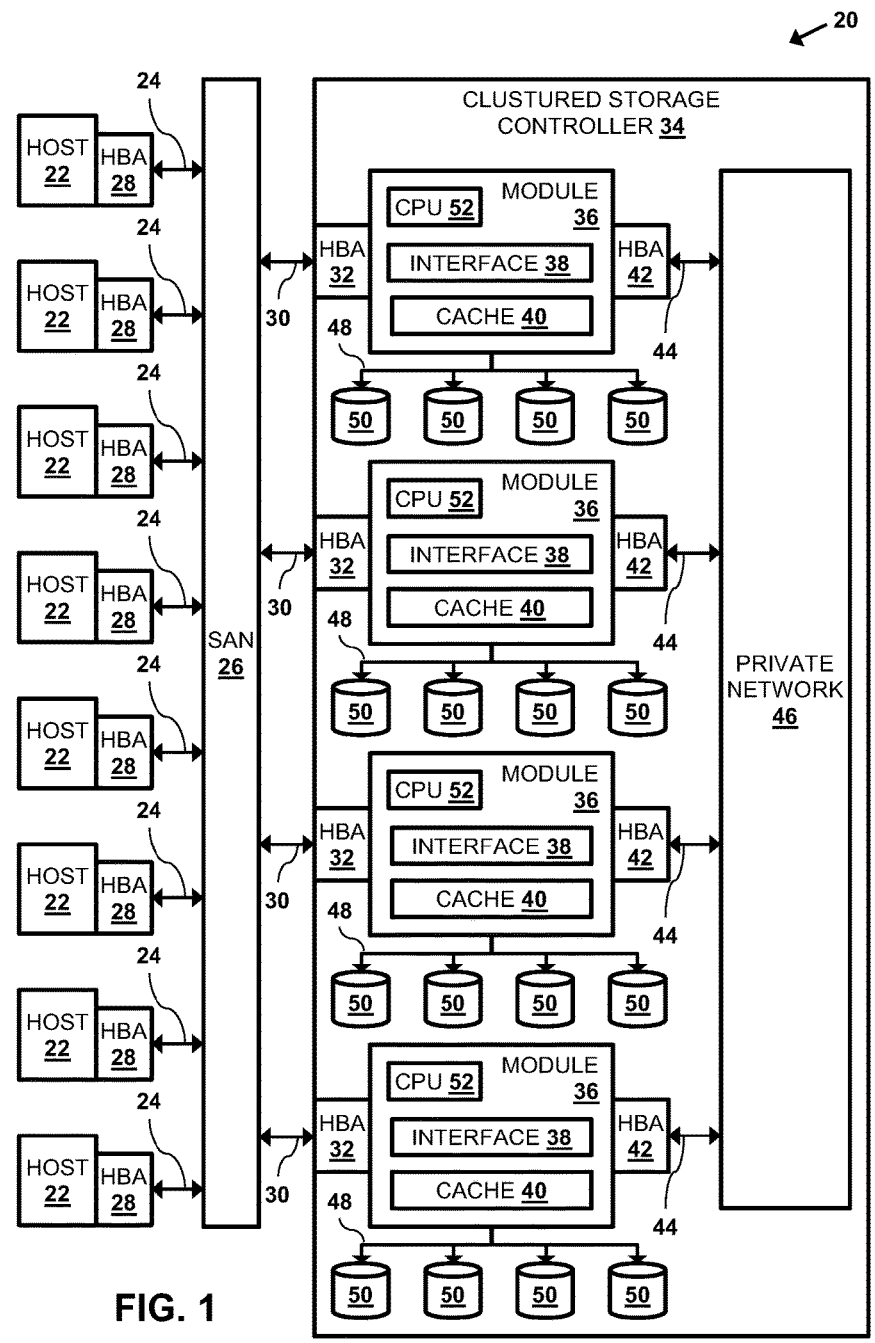
FIG. 1 is a block diagram that schematically illustrates a storage system comprising a storage controller having multiple modules configured to deploy and monitor a software-defined computing system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
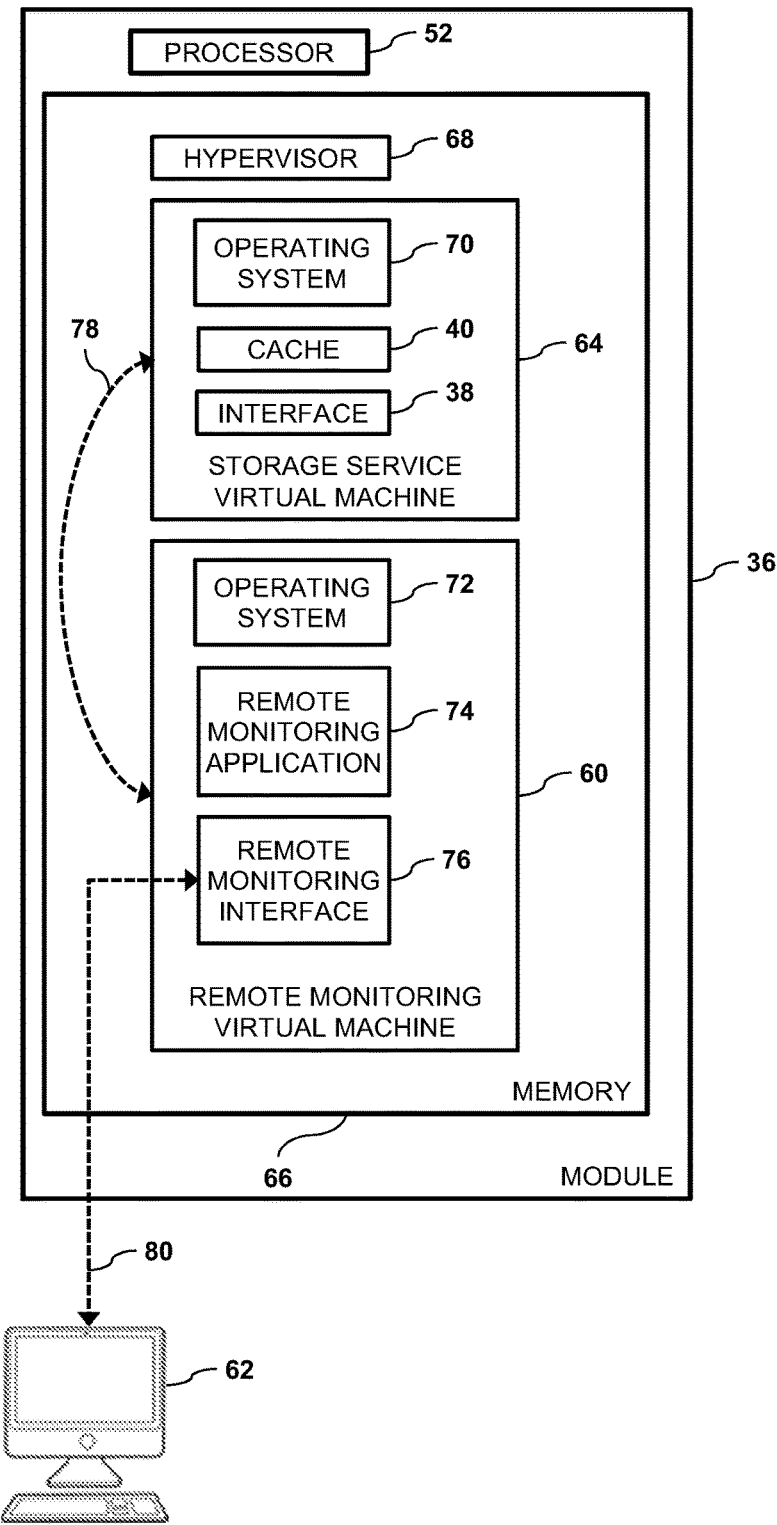
FIG. 2 is a block diagram that schematically illustrates a given module configured to provide virtual remote support connectivity client for the software defined computing system, in accordance with a first embodiment of the present invention.

FIG. 2 is a block diagram that schematically illustrates a given module 36 configured to execute a remote monitoring virtual machine 60 that enables a computer 62 to remotely monitor a storage service virtual machine 64, in accordance with a first embodiment of the present invention. While the example in FIG. 2 (and the description referencing FIG. 3 hereinbelow) shows virtual machine 64 configured to provide storage services, configuring virtual machine to provide other types of services that remote monitoring virtual machine 60 can monitor is considered to be within the spirit and scope of the present invention.

In addition to processor 52, module 36 comprises a memory 66 that stores a hypervisor that the processor executes in order to create and manage virtual machines 60 and 64 that are also stored in memory 66. In the configuration shown in FIG. 2, storage service virtual machine 64 comprises a service operating system 70, cache 40 and interface 38, and remote service virtual machine 60 comprises a support operating system 72, a remote monitoring application 74 and a remote monitoring interface 76.

Remote monitoring application 74 in virtual machine 60 communicates with virtual machine 64 via a logical connection 78 (also referred to as a backchannel) that enables hypervisor 68 to tunnel communication from one or more channels to virtual machine 60 that is running on the same hypervisor. Examples of the logical connection 78 include, but are not limited to, a physical (i.e., an actual) serial connection, a virtual serial connection, a physical data networking connection and a virtual data networking (e.g., Ethernet) connection. In some embodiments, there may be multiple logical connections between virtual machines 60 and 64, and processor 52 (e.g., via hypervisor 68) can select one or more of the multiple logical connections. For example, there may be a first logical connection 78 comprising a logical data networking connection and a second logical connection 78 comprising a physical serial connection, and if processor 52 detects a high utilization of the first logical connection, the processor can configure the second logical connection as a primary logical connection and configure the first logical connection as a secondary logical connection (e.g., for redundancy).

Remote monitoring virtual machine 60 communicates with computer 62 via logical data connection 78, and provides access (i.e., a link) to remote monitoring application 74 via remote monitoring interface 76. Examples of remote monitoring interface 76 include, but are not limited to, an application programming interface (API), a command line interface (CLI) and a graphical user interface (GUI).

In operation, virtual machine 64 can be configured as a "light weight" virtual machine that is either pre-deployed or deployed when needed by hypervisor 68, and remote monitoring application 74 running in virtual machine 60 can be configured to store log messages or dumped debug data from the software (i.e., cache 40 and interface 38) or operating system 70 running on virtual machine 64. In some embodiments, after establishing connection 80, virtual machine 60 can provide connectivity via communication protocols such as Secure Shell (SSH). Using connection 80, a support team accessing computer 60 can use a tunnel to virtual machine 64 through one of the available links to the storage service virtual machine, retrieve logs from virtual machines 60 and/or 64, or access remote monitoring interface 76 to initiate a power cycle or similar operations on virtual machine 64.

Figure 3:
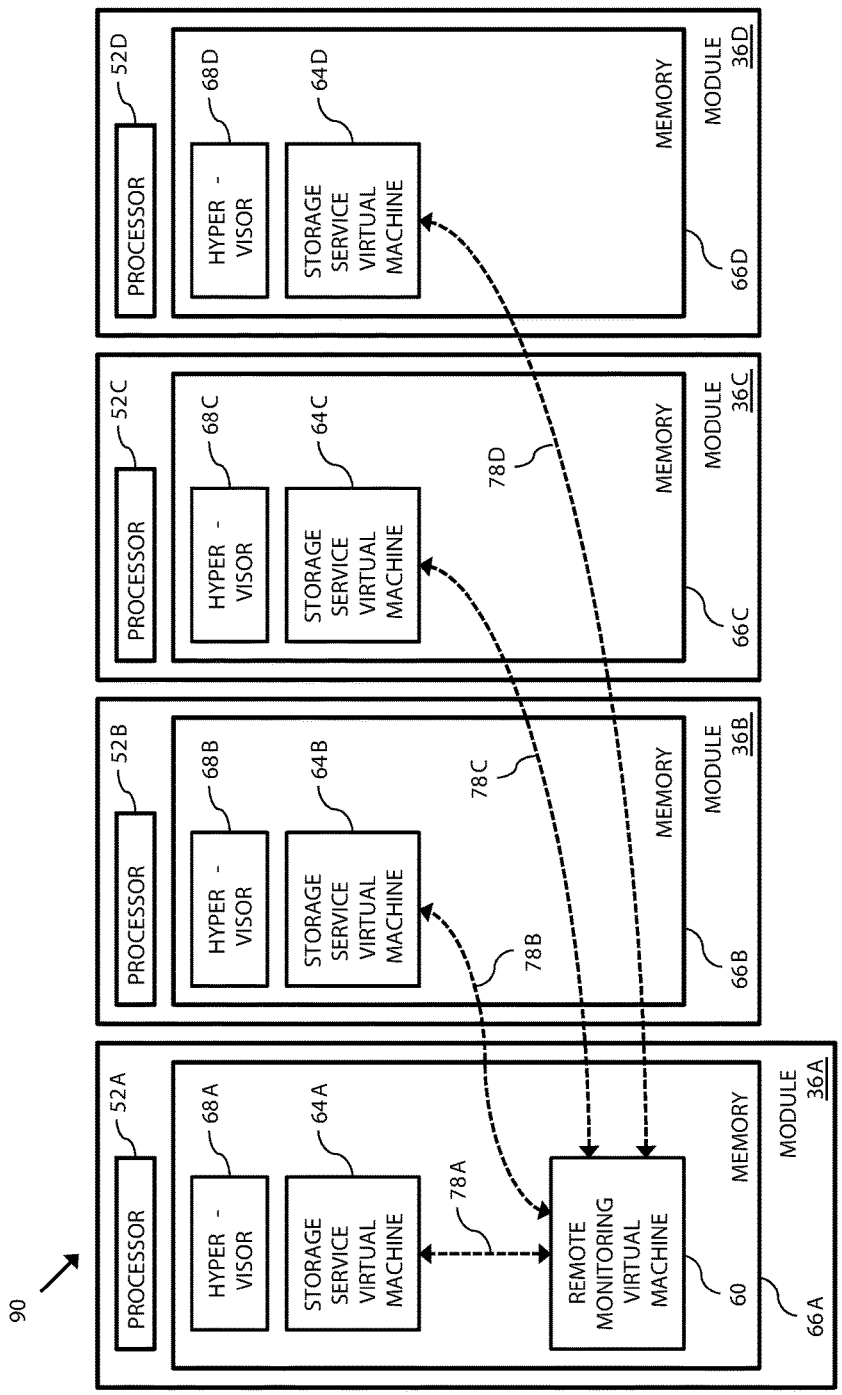
FIG. 3 is a block diagram that schematically illustrates a given module configured to provide virtual remote support connectivity client for the software defined computing system, in accordance with a second embodiment of the present invention.

FIG. 3 is a block diagram that schematically illustrates a given module 36 configured to execute a remote monitoring virtual machine 60 to monitor virtual machines 64 on modules 36 that are configured as a cluster 90, in accordance with a first embodiment of the present invention. In FIG. 3, modules 36 and their respective components are differentiated by appending a letter to the identifying numeral, so that the modules comprise modules 36A-36D. In the configuration shown in FIG. 3, remote monitoring virtual machine 60 executes from module 36A and communicates with storage virtual machines 64A-64D via logical connections 78A-78D, respectively.

When remote monitoring application 74 monitors cluster 90, the remote monitoring application allows connectivity (via connections 78) to all the virtual machines in the cluster (i.e., both virtual machine 64A that runs on the same hypervisor 64 as virtual machine 60 and virtual machines 64B-64D that run on different hypervisors 68). This connectivity is allowed since virtual machine 60 resides over the same hypervisor (i.e., hypervisors 68A) as one of the clustered nodes (i.e., virtual machine 64A), and thus can have a "leg" in the physical network used for internal communication between the nodes of the cluster. In some embodiments, the remote monitoring virtual machine may also be included in key distribution mechanisms used for maintaining secured channels between the cluster's nodes (i.e., virtual machines 64).

Additionally or alternatively, when remote monitoring application 74 monitors cluster 90 remote monitoring application 74 can maintain metadata that store information about the configuration and topology of the clustered system (e.g., IP addresses).

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processor 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Virtual Remote Support for SDC Systems

Figure 4:
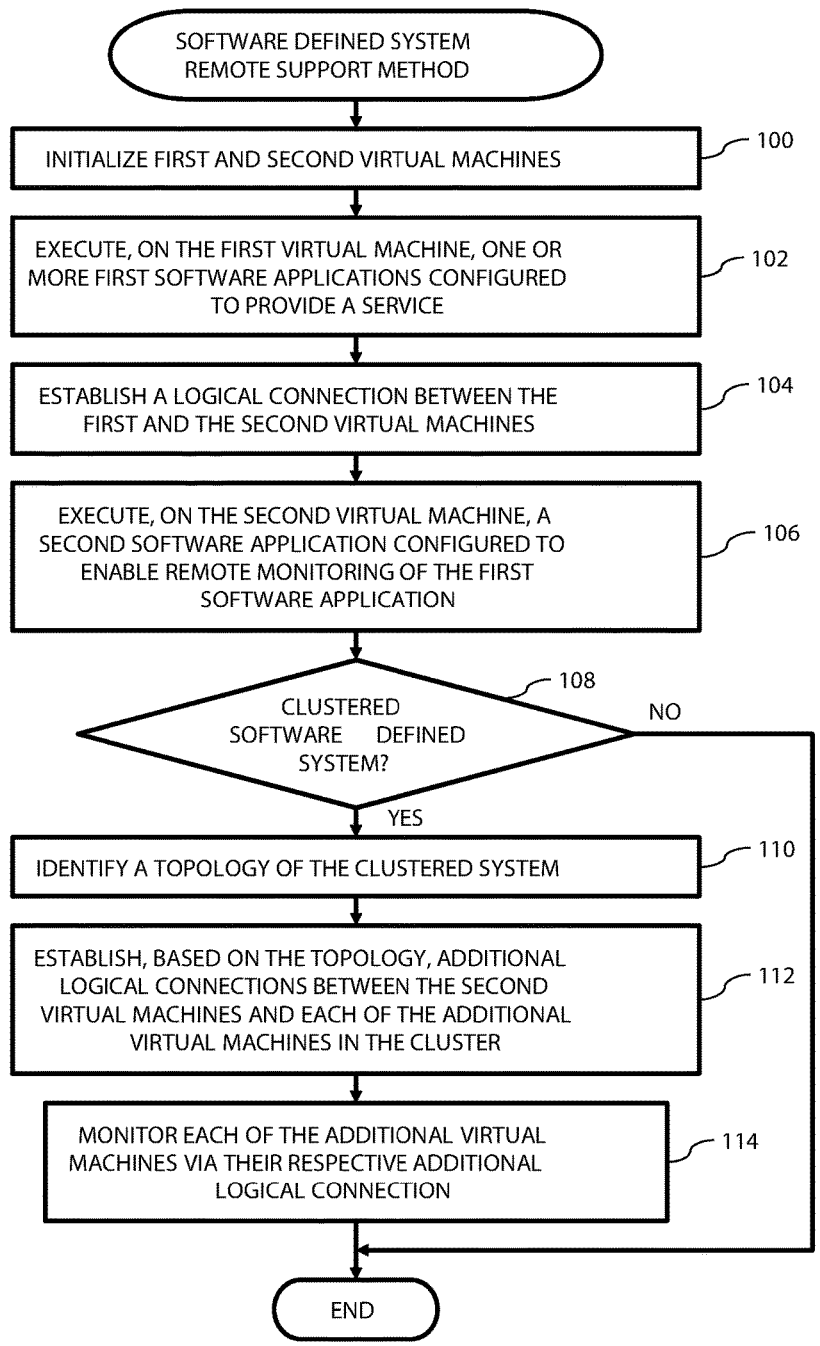
FIG. 4 is a flow diagram that schematically illustrates a method of providing remote support for the software defined computing system, in accordance with an embodiment of the preset invention.

FIG. 4 is a flow diagram that schematically illustrates a method of providing remote support for one or more virtual machines 64, in accordance with an embodiment of the preset invention. In embodiments where virtual machine 60 is providing remote support for multiple virtual machines 64, the storage service virtual machines are typically configured as a clustered software defined computing system, such as the cluster SDS system described supra in the description referencing FIG. 3.

In an initialization step 100, hypervisor 68 initializes virtual machines 60 and 64 in memory 66, and in an execution step 102, virtual machine 64 executes one or more software applications configured to provide a service. In the example shown in FIGS. 2 and 3, the software applications comprise cache 40 and interface 38, and the service comprises storage services.

In a first connection step 104, hypervisor 68 establishes a logical connection between virtual machines 60 and 64, and in a first monitoring step 106, virtual machine 60 executes remote monitoring application 74 that is configured to enable computer 62, via remote monitoring interface 76, to remotely monitor virtual machine 64. As described supra, the logical connection may comprise a virtual serial port connection or a virtual data networking connection, and the remote monitoring interface may comprise an application programming interface, a command line interface, or a graphical user interface.

In a comparison step 108, if remote monitoring application 74 is monitoring cluster 90 (e.g., as shown in FIG. 3), then the remote monitoring application identifies a topology of the cluster in an identification step 110, and hypervisor 68A establishes, based on the identified topology, additional logical connections 78B-78D in a second connection step 112. In some embodiments, remote monitoring application 74 can identify the topology by receiving IP addresses and other information about the nodes (i.e., virtual machines 64B-64D) in the cluster.

Finally, in a second monitoring step 114, remote monitoring application 74 monitors each of the additional storage service virtual machines, and the method ends. Returning to step 108, if remote monitoring application 74 is only monitoring a single instance of virtual machine 64, then the method ends. While the description for steps 108-114 describes remote monitoring application 74 monitoring cluster 90, configuring the remote monitoring application to monitor any other type clustered software defined computing system comprising multiple virtual machines configured as nodes in the cluster is considered to be within the spirit and scope of the present invention.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    initializing in a software-defined computing system, by a hypervisor executing on a processor, first and second virtual machines;
    executing, on the first virtual machine, a first software application configured to provide a service; and
    executing, on the second virtual machine, a second software application configured to enable remote monitoring of the first software application via a data connection by deploying a virtual remote support connectivity client in the second virtual machine executing on the hypervisor using the first virtual machine as a proxy to enable the remote monitoring of the first software application.

2. The method according to claim 1, wherein the data connection is selected from a group consisting of a physical serial connection, a virtual serial connection, a physical data networking connection and a virtual data networking connection.

3. The method according to claim 1, wherein the second software application remotely monitors the first software application via an interface selected from a group consisting of a command line interface, a graphical user interface and an application programming interface.

4. The method according to claim 1, wherein the service comprises a storage service.

5. The method according to claim 1, wherein the first software application comprises a first given node in a cluster comprising one or more additional nodes, each of the additional nodes executing a respective additional hypervisor, each of the additional hypervisors managing a respective additional virtual machine, each of the additional virtual machines executing an additional instance of the first software application.

6. The method according to claim 5, further comprising identifying, by the second software application, topology information for the cluster, establishing, based on the identified topology information, an additional data connection between the second virtual machine and each of the additional virtual machines, and monitoring each of the additional virtual machines via its respective data connections.

7. The method according to claim 6, wherein the topology information for the cluster comprises a respective internet protocol (IP) address for each of the nodes.

8. An apparatus, comprising:
    a memory; and
    a processor configured:
        to initialize in a software-defined computing system, by a hypervisor stored in the memory, first and second virtual machines in the memory,
        to execute, on the first virtual machine, a first software application configured to provide a service,
        to execute, on the second virtual machine, a second software application configured to enable remote monitoring of the first software application via a data connection by deploying a virtual remote support connectivity client in the second virtual machine executing on the hypervisor using the first virtual machine as a proxy to enable the remote monitoring of the first software application.

9. The apparatus according to claim 8, wherein the data connection is selected from a group consisting of a physical serial connection, a virtual serial connection, a physical data networking connection and a virtual data networking connection.

10. The apparatus according to claim 8, wherein the second software application is configured to remotely monitor the first software application via an interface selected from a group consisting of a command line interface, a graphical user interface and an application programming interface.

11. The apparatus according to claim 8, wherein the service comprises a storage service.

12. The apparatus according to claim 8, wherein the first software application comprises a first given node in a cluster comprising one or more additional nodes, each of the additional nodes executing a respective additional hypervisor, each of the additional hypervisors managing a respective additional virtual machine, each of the additional virtual machines executing an additional instance of the first software application.

13. The apparatus according to claim 12, wherein the second software application is configured to identify topology information for the cluster, to establish, based on the identified topology information, an additional data connection between the second virtual machine and each of the additional virtual machines, and to monitor each of the additional virtual machines via its respective data connections.

14. The apparatus according to claim 13, wherein the topology information for the cluster comprises a respective internet protocol (IP) address for each of the nodes.

15. A computer program product, the computer program product comprising:
    a non-transitory computer readable storage medium having computer readable program code embodied therewith, the computer readable program code comprising:
    computer readable program code configured to initialize in a software-defined computing system, by a hypervisor, first and second virtual machines;
    computer readable program code configured to execute, on the first virtual machine, a first software application configured to provide a service;
    computer readable program code configured to execute, on the second virtual machine, a second software application configured to enable remote monitoring of the first software application via a data connection by deploying a virtual remote support connectivity client in the second virtual machine executing on the hypervisor using the first virtual machine as a proxy to enable the remote monitoring of the first software application.

16. The computer program product according to claim 15, wherein the data connection is selected from a group consisting of a physical serial connection, a virtual serial connection, a physical data networking connection and a virtual data networking connection.

17. The computer program product according to claim 15, wherein the second software application is configured to provide the remote monitoring via an interface selected from a group consisting of a command line interface, a graphical user interface and an application programming interface.

18. The computer program product according to claim 15, wherein the service comprises a storage service.

19. The computer program product according to claim 15, wherein the first software application comprises a first given node in a cluster comprising one or more additional nodes, each of the additional nodes executing a respective additional hypervisor, each of the additional hypervisors managing a respective additional virtual machine, each of the additional virtual machines executing an additional instance of the first software application.

20. The computer program product according to claim 19, further comprising computer readable program code configured to by the second software application, topology information for the cluster, to establish, based on the identified topology information, an additional data connection between the second virtual machine and each of the additional virtual machines, and to monitor each of the additional virtual machines via its respective data connections.

* * * * *